United States Patent
Hathaway

(10) Patent No.: US 10,530,798 B2
(45) Date of Patent: Jan. 7, 2020

(54) SYSTEMS AND METHODS RELATED TO CONFIGURATIONS FOR MOBILE COMMUNICATION DEVICE SECURITY

(71) Applicant: MASTERCARD INTERNATIONAL INCORPORATED, Purchase, NY (US)

(72) Inventor: Nicole Deanne Hathaway, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 222 days.

(21) Appl. No.: 15/836,538

(22) Filed: Dec. 8, 2017

(65) Prior Publication Data

US 2019/0182277 A1    Jun. 13, 2019

(51) Int. Cl.
*H04L 29/06* (2006.01)
*H04W 12/12* (2009.01)
*H04W 24/08* (2009.01)
*H04W 8/02* (2009.01)

(52) U.S. Cl.
CPC .......... *H04L 63/1425* (2013.01); *H04W 8/02* (2013.01); *H04W 12/12* (2013.01); *H04W 24/08* (2013.01)

(58) Field of Classification Search
CPC .... H04L 63/1425; H04W 8/02; H04W 24/08; H04W 12/12; H04W 12/00503; H04W 12/1208
See application file for complete search history.

(56) References Cited

U.S. PATENT DOCUMENTS

| | | | |
|---|---|---|---|
| 8,826,413 B2* | 9/2014 | Vijayakumar | H04L 12/413 370/312 |
| 9,609,460 B2* | 3/2017 | Sinha | H04W 12/08 |
| 10,008,107 B2* | 6/2018 | Li | G08B 29/26 |
| 10,021,703 B2* | 7/2018 | Mishra | H04L 12/66 |
| 2016/0226890 A1* | 8/2016 | Harang | H04L 63/1408 |
| 2018/0219914 A1* | 8/2018 | Reith | H04W 12/08 |
| 2019/0182266 A1* | 6/2019 | Doron | H04W 12/06 |

* cited by examiner

*Primary Examiner* — Christopher A Revak
(74) *Attorney, Agent, or Firm* — Harness, Dickey & Pierce, P.L.C.

(57) ABSTRACT

Systems and methods herein relate to monitoring traffic for mobile devices for threats. One method includes defining, in a data structure, groups based on a characteristic. A mobile device is then enrolled under one of the groups. In so doing, a security application monitors traffic for the device for threats, based on the device's enrollment group, when the device is associated with a characteristic on which its enrollment group is based. When the device is no longer associated with the characteristic on which its enrollment group is based, the device is re-enrolled under a different group.

20 Claims, 3 Drawing Sheets

SYSTEMS AND METHODS RELATED TO CONFIGURATIONS FOR MOBILE COMMUNICATION DEVICE SECURITY

FIELD

The present disclosure generally relates to configurations for mobile communication device security, and in particular, to systems and methods for permitting configuration of mobile communication devices based on group associations of the mobile communication devices.

BACKGROUND

This section provides background information related to the present disclosure which is not necessarily prior art.

People (broadly, users) often use mobile communication devices (e.g., smartphones, tablets, laptops, smartwatches, etc.) to connect to one or more networks. Users often connect to the Internet, for example, via their mobile communication devices. The mobile communication devices are often enabled to connect to the networks by a mobile carrier (e.g., AT&T®, T-Mobile®, etc.), a wireless local area network connection (WLAN) (e.g., Wi-Fi, etc.), or other types of connections, etc. In conjunction therewith, users often utilize their mobile communication devices to transmit and receive data in a variety of ways (e.g., via email, messaging, web browsing, voice communication, video communication, file sharing, social networking, streaming, downloading files, uploading files, etc.). As is known, communicating data over public networks, for example, may make the data susceptible to a variety of threats (e.g., security risks, viruses, malware, spyware, intrusions, hacks, etc.).

Security systems for mobile communication devices are known to monitor data traffic, directed to and originating from a plurality of mobile communication devices, for certain threats, at the mobile communication devices themselves (e.g., via applications, etc.) and/or remotely (e.g., in the cloud, etc.). Such systems may monitor traffic for each mobile communication device dependent upon a mobile communication device being enrolled to a mobile device management (MDM) system under one or more characteristics and thereafter operating in accordance with the one or more characteristics.

As an example, a mobile communication device may be required to enroll with known security systems under a specific carrier and/or region of operation in order for threat monitoring to occur. Enrollment as such may be necessitated by, for example, carrier- and/or region-specific requirements attendant to data traffic access and monitoring processes (e.g., a particular carrier and/or region of operation may require the use of carrier- and/or region-specific codes in order for such systems to access and monitor data traffic for a mobile communication device associated with the carrier or region of operation, etc.). Threat monitoring by such systems, then, may be dependent on the mobile communication device operating with the specific carrier and/or in the specific region under which it was enrolled. In this regard, if the mobile communication device establishes a connection with a new carrier and/or becomes disposed in a new region (different from that under which it was enrolled), such security systems may no longer be able to access data traffic for the mobile communication device (and, thus, no longer be able to monitor the data traffic for threats).

To restore threat monitoring, it is known to manually (and significantly) reconfigure the mobile communication device itself, in conjunction with such security systems, for enrollment under the new carrier and/or region (e.g., by enterprise wiping the device (e.g., to remove all access to the MDM system and configurations), deleting the device from the MDM system, and reconfiguring the device with new certificates, tokens, and credentials so as to re-enroll the device with the MDM system under the new carrier and/or region; etc.), which is a time consuming and labor intensive process, typically requiring the assistance of an IT professional to the end-user of the device. Enrolling a new device with the MDM system in the first instance is similarly labor intensive and time consuming.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Uniquely, the systems and methods herein permit the continuous monitoring of data traffic, directed to and originating from a plurality of mobile communication devices, for threats, without manually reconfiguring the mobile communication devices or deleting the devices from the MDM system, etc., when one or more of the mobile communication devices changes mobile carriers or regions of operation.

Figure 1:
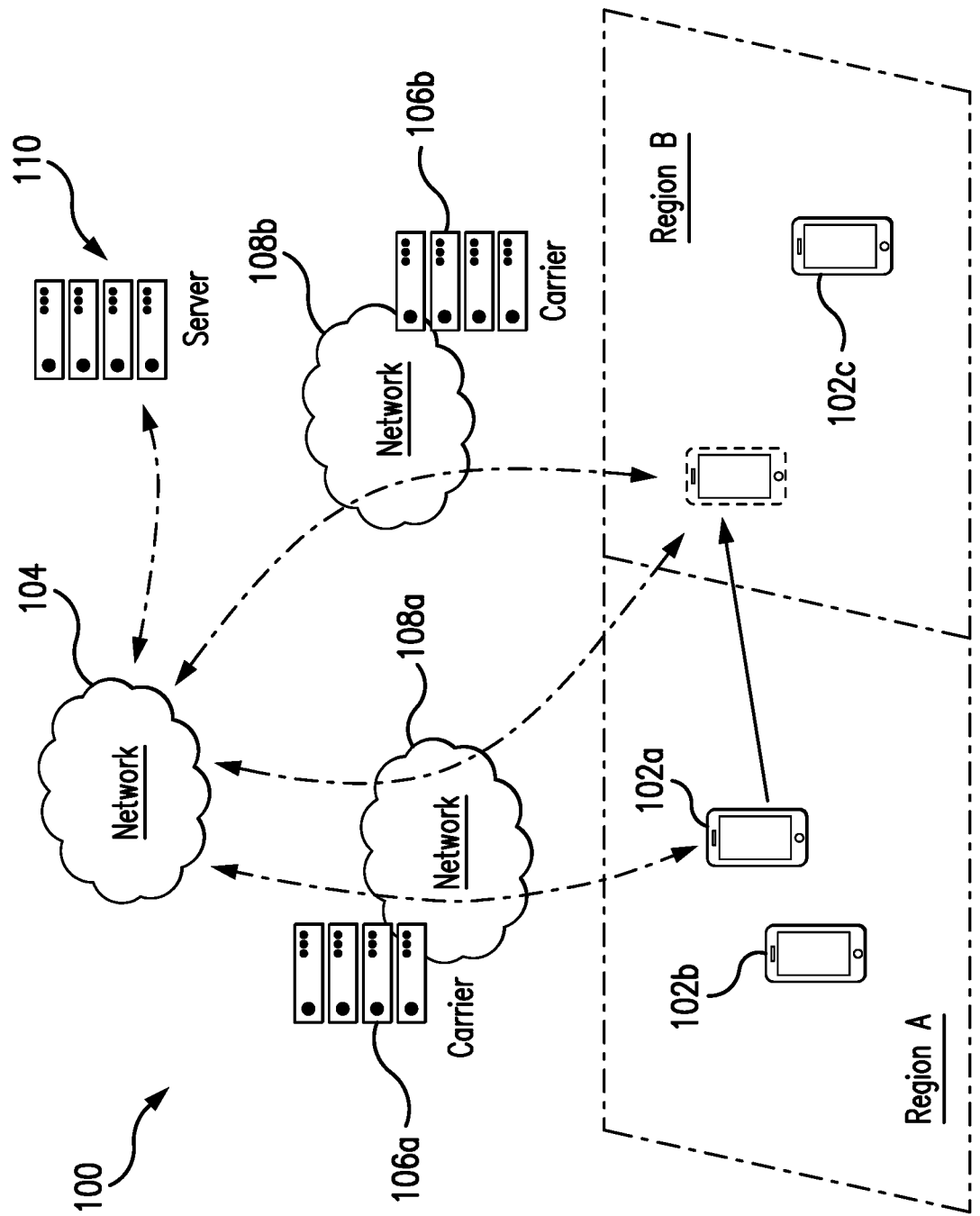
FIG. 1 illustrates an exemplary system suitable for use in continuously monitoring, without significant reconfiguration, mobile communication device traffic for threats.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, and without limitation, particular types of devices and entities employed or subject to the threat monitoring (e.g., particular types of communication devices, carriers, networks, servers, data structures, etc.).

The system 100 generally includes multiple mobile communication devices 102a-c. Each of the mobile communication devices 102a-c may include, for example, a smartphone, a tablet, a laptop, a smartwatch, etc., which generally is a portable communication device. In general, each of the mobile communication devices 102a-c is configured to access a network 104, which may include, for example, the Internet or other suitable network (or wide-area network (WAN)).

In connection therewith, the mobile communication devices 102a-c are configured to communicate with and/or through the network 104, via a local area network (LAN) or a mobile network. In this exemplary embodiment, the system 100 includes two mobile carriers 106a-b, which may include, for example, and without limitation, AT&T®, Sprint®, Verizon®, T-Mobile®, or other suitable mobile carrier. The mobile carriers 106a-b, in general, each provide voice and/or data services to mobile communication devices connected and/or coupled thereto. As shown in FIG. 1, for example, each of the mobile carriers 106a-b provides a mobile network 108a-b, respectively. And, the mobile communication devices 102a-b are associated with and/or subscribed to the mobile network 108a, via the mobile carrier 106a, while the mobile communication device 102c is associated with and/or subscribed to the mobile network 108b, via the mobile carrier 106b.

Further, each of the mobile communication devices 102a-c in the system 100 is disposed within a geographic region. In this exemplary embodiment, the mobile communication devices 102a-c are disposed in one of two regions: Region A and Region B. The regions may be defined by any suitable boundary. For example, the regions may be defined by countries, states, provinces, territories, counties, cities, postal codes, etc. What's more, the regions may be defined by a coverage area of the mobile network 108a-b, or other networks.

In this exemplary embodiment, the system 100 further includes a host server 110, which is associated with an entity, such as, for example, a company, a business, a group, an organization, etc. The server 110 is configured to provide data storage, one or more related services (e.g., email services, etc.), and/or applications based on the data, and/or access to the data and/or services, etc., to the mobile communication devices 102a-c. In one exemplary implementation, the entity includes a business, and the business includes the server 110 in order to host application(s) and/or data for purposes related to the business, whereby users (e.g., employees, etc.) may access the server 110 to use the application(s) and/or access data therein, etc., via the mobile communication devices 102a-c. The server 110 may also host one or more security application(s), such as a Wandera® mobile security application, whereby data traffic associated with the mobile communication devices 102a-c of the users (e.g., employees associated with the entity, etc.) may be monitored remotely for threats. It should be appreciated that the server 110 associated with the entity may be maintained by the entity or hosted by a third party (e.g., in a cloud-based fashion, etc.).

Regardless of the type of entity associated with the server 110 or whether the server 110 associated with the entity is maintained by the entity or hosted by a third party, the server 110 is configured to manage the mobile communication devices 102a-c to control access by the devices 102a-c to the server 110 and to allow data traffic associated with the devices 102a-c to be monitored for threats. In connection therewith, the server 110 may, for example, include one or more domains. The domains may be subject to a domain management service, such as, for example, an active directory service, whereby the entity may include one or more groups within the one or more domains, with the users being subject to authentication and/or authorization for the services made available by the server 110 and/or within the one or more domains. In particular, for example, the groups may be defined (e.g., within the active directory service or the one or more domains, or in a data structure associated with the active directory service or the one or more domains, etc.) based on one or more characteristics associated with members of the groups (e.g., one or more common characteristics of the users' mobile communication devices 102a-c, etc.), such as a mobile carrier and a region of operation, etc. In connection therewith, the entity may enroll the users of the server 110 (and more broadly, the entity) into the one or more groups based on the one or more characteristics, whereby users become members of the groups under which they are enrolled. The mobile communication devices 102a-c of the users, for example, may similarly be enrolled under different groups (e.g., mobile device groups, etc.) within the active directory for the server 110. The enrollments may, for example, be based on whether the mobile communication devices 102a-c of the users are associated with and/or subscribed to mobile carrier 106a or 106b and/or based on whether the mobile communication devices 102a-c are located in Region A or B.

In one example, a first mobile device group is defined based on mobile carrier 106a and Region A, and a second, different mobile device group is defined based on mobile carrier 106b and Region B. The first mobile device group may, for example, include mobile communication devices 102a-b enrolled thereunder, and the second mobile device group may include mobile communication device 102c enrolled thereunder. That said, mobile communication devices may be enrolled in groups defined based on the same, different, and/or additional characteristics in other embodiments. For example, mobile device groups may be based on employment status (e.g., title, etc.) of the user, job tasks of the user, job types of the user, main office location of the user, etc. Regardless, as long as the given security applications are mapped to the active directory for the server 110, the given service(s) will not be interrupted when the devices move between the regions.

In connection therewith, the server 110 may be configured such that a particular mobile communication device may be enrolled as a member of a group by indicating in a data structure (e.g., in the server 110, etc.) that the particular mobile communication device is a member of a defined group, or unenrolled from the group by indicating in the data structure that the particular mobile communication device is a member of a different defined group. Further, the server 110 may be configured such that a mobile communication device may be enrolled as a member of a group by indicating in a data structure one or more characteristics associated with the mobile communication device (e.g., mobile carrier and region of operation, etc.). The server 110, then, may be configured to associate the mobile communication device with a defined group corresponding to the indicated characteristic(s) (e.g., mobile carrier and region of operation, etc.) and indicate in the data structure that the mobile communication device is a member of the associated group. It should be appreciated that the data structure in which membership is indicated may, or may not, be a same data structure in which the one or more mobile device groups are defined.

In addition in the system 100, the server 110, or entity associated with the server 110, may require one or more applications to be included and/or active in the mobile communication devices 102a-c prior to issuing the devices 102a-c to the users and/or permitting access by the devices 102a-c to the server 110. Specifically, for example, the mobile communication devices 102a-c may be required to include (e.g., to have installed thereon, etc.) a mobile security application, such as, for example, a Wandera® or Lookout® mobile security application, etc., to guard against certain types of threats to the devices 102a-c. In particular, the mobile security application may be configured to detect one or more threats in monitored data traffic for the devices 102a-c in which it is included. If a threat(s) is detected, the application may be configured to notify the corresponding one(s) of the mobile communication devices 102a-c or the users thereof and, depending on the configuration of the given devices 102a-c, block the traffic associated with the detected threat(s) or the threat(s) itself, etc. The application may be configured to further indicate at the server 110 (e.g., in a data structure associated therewith, etc.) (or at another location) that one or more threats were detected in the monitored data traffic. In this manner, the mobile security application may be configured to indicate, for a particular mobile communication device identified in the data structure, that one or more threats were detected in monitored data traffic for that particular mobile communication device. In connection therewith, the mobile security application may be configured to identify a time of detection (e.g., a date, time, hour, minute, second, etc.), the type of threat(s) detected (e.g., virus, spyware, etc.), and the identity of the one or more detected threats, as well as any other information associated with the detected one or more threats (and potentially block the threat(s)).

It should be appreciated that a security application hosted at the server 110, such as a Wandera® mobile security application (consistent with the above), may similarly be configured to detect threats in monitored data traffic for the devices 102a-c (either alone, or in conjunction with the mobile security application included at the devices 102a-c), notify the particular one(s) of the devices 102a-c or the users thereof (e.g., via a transmission) if a threat is detected in data traffic for the devices 102a-c, and, potentially, block traffic associated with the detected threat or the threat itself, etc. The security application hosted at the server 110 may be configured to further indicate at the server 110 (e.g., in a data structure, etc.) (or at another location) that one or more threats were detected in the monitored data traffic. In this manner, the security application hosted at the server 110 may be configured to indicate, for a particular mobile communication device identified in the data structure, that one or more threats were detected in monitored data traffic for that particular mobile communication device. In connection therewith, the security application may be configured to identify a time of detection (e.g., a date, time, hour, minute, second, etc.), the type of threat detected (e.g., virus, spyware, etc.), and the identity of the one or more detected threats, as well as any other information associated with the detected one or more threats. Again, it should be appreciated that the security application hosted at the server 110 may be maintained by the entity or hosted by a third party (e.g., in a cloud-based fashion, etc.).

In any event, in order for the mobile security application included at the various devices 102a-c and for the security application hosted at the server 110 to operate as described above, the security applications are configured to access and monitor, for threats, data traffic associated with the mobile communication devices 102a-c in accordance with carrier- and/or region-specific requirements (e.g., by way of carrier- and/or region-specific codes, etc.). The carrier- and/or region-specific requirements may be accessed and/or retrieved by the mobile security application included at the various devices 102a-c and the security application hosted at the server 110 from a MDM system associated with the security application. In connection therewith, the security applications must be aware of the mobile carrier and/or region of operation of each of the mobile communication devices 102a-c for which they are configured to access and monitor data traffic (for threats), so that the security applications may access and/or retrieve the appropriate carrier- and/or region-specific requirements from the MDM system and may access and monitor the data traffic based on the carrier- and/or region-specific requirements. It should be appreciated that the MDM system may be maintained by the entity or hosted by a third party (e.g., in a cloud-based fashion, etc.).

The security applications, then, are configured to access and monitor data traffic for the mobile communication devices 102a-c based on the defined groups under which the devices 102a-c are enrolled. For instance, where groups are part of an active directory service (e.g., defined within the active directory services or a domain or data structure associated therewith), the security applications may be mapped to the active directory service. For example, and with reference to FIG. 1, a first mobile device group may be defined based on mobile carrier 106a and Region A, and a second mobile device group may be defined based on mobile carrier 106b and Region B. The first mobile device group, then, may include mobile communication devices 102a-b enrolled thereunder (based on their association with mobile carrier 106a and Region A), and the second mobile device group, then, may include mobile communication device 102c enrolled thereunder (based on its association with mobile carrier 106b and Region B). In connection therewith, based on the enrollment of mobile communication device 102a under the first group, the security applications included at the device 102a and at the server 110 are configured to access and monitor, for threats, data traffic for device 102a in accordance with mobile carrier 106a- and Region A-specific requirements (e.g., by applying mobile carrier 106a- and Region A-specific codes in order to access and monitor data traffic for device 102a, etc.). Similarly, based on the enrollment of mobile communication device 102b under the first group, the security applications are configured to access and monitor data traffic for device 102b for threats in accordance with mobile carrier 106a- and Region A-specific requirements (e.g., by applying mobile carrier 106a- and Region A-specific codes in order to access data traffic for device 102b, etc.). Further, based on the enrollment of mobile communication device 102c under the second group, the security applications included at the device 102c and the server 110 are configured to access and monitor data traffic for device 102c for threats in accordance with mobile carrier 106b- and Region B-specific requirements (e.g., by applying mobile carrier 106b- and Region B-specific codes in order to access and monitor data traffic for device 102c, etc.). In view of the above, it should be appreciated that the security applications may access and monitor data traffic for each of mobile communication devices 102a-c when each device is operating in accordance with the one or more characteristics (in this example, the mobile carrier and region of operation) on which the mobile device group under which the device is enrolled is based.

It should also be appreciated that one or more of the mobile communication devices 102a-c may be enrolled under a group via the MDM system associated with the security applications in response to user input (e.g., input from an administrator with access to a configuration portal for the MDM system, etc.). For example, a user with access to the MDM system (e.g., via a configuration portal, etc.) may issue an enrollment/move command to the MDM system indicating that one or more of mobile communication devices 102a-c is to be enrolled/moved under a particular group, whereby the MDM system may instruct and/or communicate to the server 110 to enroll/move the one or more of devices 102a-c under the indicated group. The server 110, then, may enroll/move the one or more mobile communication devices 102a-c under the indicated group (e.g., via the active directory service, etc.), in a manner consistent with the above-described enrollment process.

In other embodiments, one or more of the mobile communication devices 102a-c may be enrolled under a group (consistent with the enrollment process described above), based on the mobile communication devices 102a-c detecting the respective one of the mobile carriers 106a-b with which the devices 102a-c are associated and/or their region of operation, whereby the detected carrier(s) and/or region(s) may then be transmitted by the devices 102a-c to the server 110 and/or MDM system, such that the server 110 and/or MDM system may associate the devices 102a-c with the appropriate groups, corresponding to the detected carrier(s) and/or region(s) and, then, indicate in the data structure (e.g., at the server 110, etc.) that the devices 102a-c are members of the associated groups and/or, in the case of the MDM system, instruct or communicate to the server 110 to enroll the devices 102a-c with the appropriate groups. In still other embodiments, one or more of the mobile communication devices 102a-c may be enrolled under a group (consistent with the enrollment process described above), based on the devices 102a-c transmitting indications of the groups under which they should be enrolled (based on the detected mobile carriers 106a-b and/or regions), such that the server 110 may indicate in the data structure (e.g., at the server 110, etc.) that the devices 102a-c are members of the indicated groups (e.g., via an active directory service, etc.) and/or such that the MDM system may instruct and/or communicate to the server 110 to enroll the devices 102a-c in the indicated groups.

Regardless of the particular manner in which the mobile communication devices 102a-c are enrolled under mobile device groups in the exemplary system 100, if one or more mobile communication devices 102a-c changes mobile carriers and/or regions of operation (as indicated by the arrow in FIG. 1 for device 102a), the security applications may continue to access and monitor data traffic for the mobile communication device 102a without significant reconfiguration (e.g., without manually reconfiguring the device 102a or deleting the device 102a from the MDM system, etc.), whereby the mobile communication devices 102a-c need only be re-enrolled in the system 100 by moving the devices 102a-c to a new mobile device group (e.g., without enterprise wiping the devices to remove all access to the MDM system and configurations therefore, without deleting the devices from the MDM system, and without reconfiguring the devices with new certificates, tokens, and credentials so as to re-enroll the devices with the MDM system under the new carrier and/or region; etc.). For example, if the user of mobile communication device 102a relocates from Region A to Region B and changes from mobile carrier 106a to the mobile carrier 106b (as indicated by the arrowed line in FIG. 1), the mobile communication device 102a may be easily re-enrolled under the second mobile device group (again, defined based on mobile carrier 106b and Region B) by enrolling the mobile communication device 102a in the second mobile device group (consistent with the enrollment process described above). Based on the re-enrollment of mobile communication device 102a under the second group, the security applications, then, may easily continue to access and monitor data traffic for the device 102a, for threats, in accordance with mobile carrier 106b- and Region B-specific requirements (e.g., by applying mobile carrier 106b- and Region B-specific codes in order to access and monitor data traffic for device 102a, etc.). In this manner, the mobile device 102a (or another other re-enrolled device) need not be manually reconfigured or deleted from the MDM system, etc., in order for threat monitoring for the device by the security applications to continue when the mobile device 102a changes mobile carrier and/or region of operation.

As another example, if the user of mobile communication device 102c, then, relocates to Region A and changes from mobile carrier 106b to the mobile carrier 106a, the mobile communication device 102c may be easily re-enrolled under the first mobile device group (again, defined based on mobile carrier 106a and Region A) by enrolling the mobile communication device 102c in the first mobile device group (consistent with the enrollment process described above). Based on the re-enrollment of mobile communication device 102c under the first group, the security applications, then, may easily continue to access and monitor, for threats, data traffic for device 102c in accordance with mobile carrier 106a- and Region A-specific requirements (e.g., by applying mobile carrier 106a- and Region A-specific codes in order to access and monitor data traffic for device 102c, etc.). And, again, threat monitoring for the device by the security applications may continue without manually reconfiguring the device or deleting the device from the MDM system, etc.

It should be appreciated that one or more of the mobile communication devices 102a-c may be re-enrolled under a group via the MDM system associated with the security applications in response to user input (e.g., input from an administrator with access to a configuration portal for the MDM system, etc.), consistent with the above-described enrollment process in relation to the MDM system. For example, a user with access to the MDM system (e.g., via a configuration portal, etc.) may issue a move command to the MDM system indicating that one or more of mobile communication devices 102a-c is to be enrolled under an indicated new group (and, in embodiments, unenrolled from the current group), whereby the MDM system may instruct and/or communicate to the server 110 to enroll the one or more of devices 102a-c under the indicated group. The server 110, then, may enroll the one or more mobile communication devices 102a-c under the indicated group (e.g., via an active directory service, etc.), in a manner consistent with the above-described enrollment process.

Figure 2:
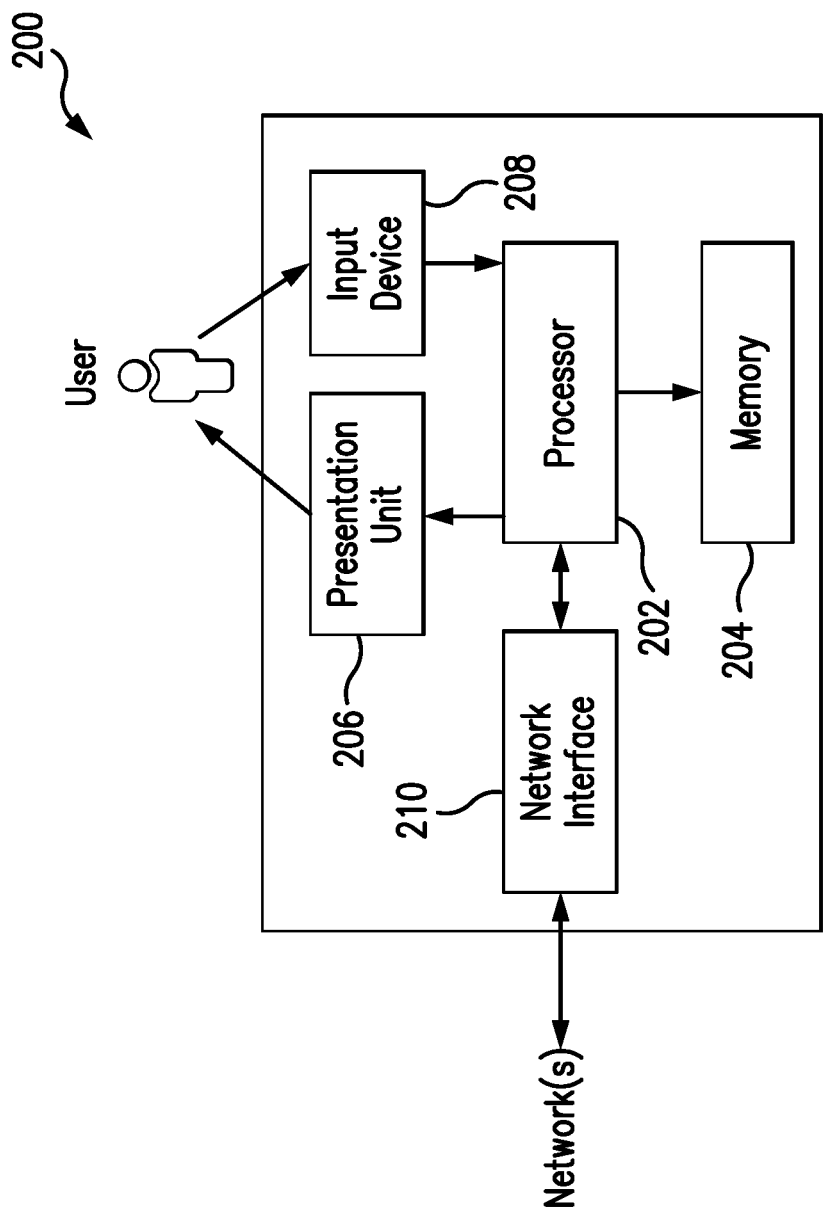
FIG. 2 is a block diagram of an exemplary computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the mobile communication devices 102a-c, the carriers 106a-b, and the server 110 may be considered a computing device consistent with and/or implemented in a computing device consistent with computing device 200. With that said, the system 100 should not be considered limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read-only memory (ROM), erasable programmable read-only memory (EPROM), solid state devices, flash drives, CD-ROMs, thumb drives, floppy disks, tapes, hard disks, and/or any other type of volatile or nonvolatile physical or tangible computer-readable media. The memory 204 may also include one or more data structures (e.g., a data structure at the server 110, etc.), and may further be configured to store, without limitation, mobile device group definitions, mobile communication device identifiers, identities of mobile carriers associated therewith, and regions of operation associated therewith, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. It should be appreciated that the memory 204 may include a variety of different memories, each implemented in one or more of the functions or processes described herein.

In addition in the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information, either visually or audibly, to a user of the computing device 200. Various interfaces (e.g., as defined by network-based applications, webpages, short message service (SMS) messages, emails, etc.) may also be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

The computing device 200 also includes an input device 208 that receives inputs from the user of the computing device 200 (i.e., user inputs). The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

Further, the illustrated computing device 200 includes a network interface 210 coupled to the processor 202 and the memory 204. The network interface 210 may include, without limitation, a wired network adapter, a wireless network adapter, a mobile network adapter, or other device capable of communicating to one or more different networks, including network 104 and mobile networks 108*a-b*, etc. Further, in some exemplary embodiments, the computing device 200 includes the processor 202 and one or more network interfaces incorporated into or with the processor 202.

Figure 3:
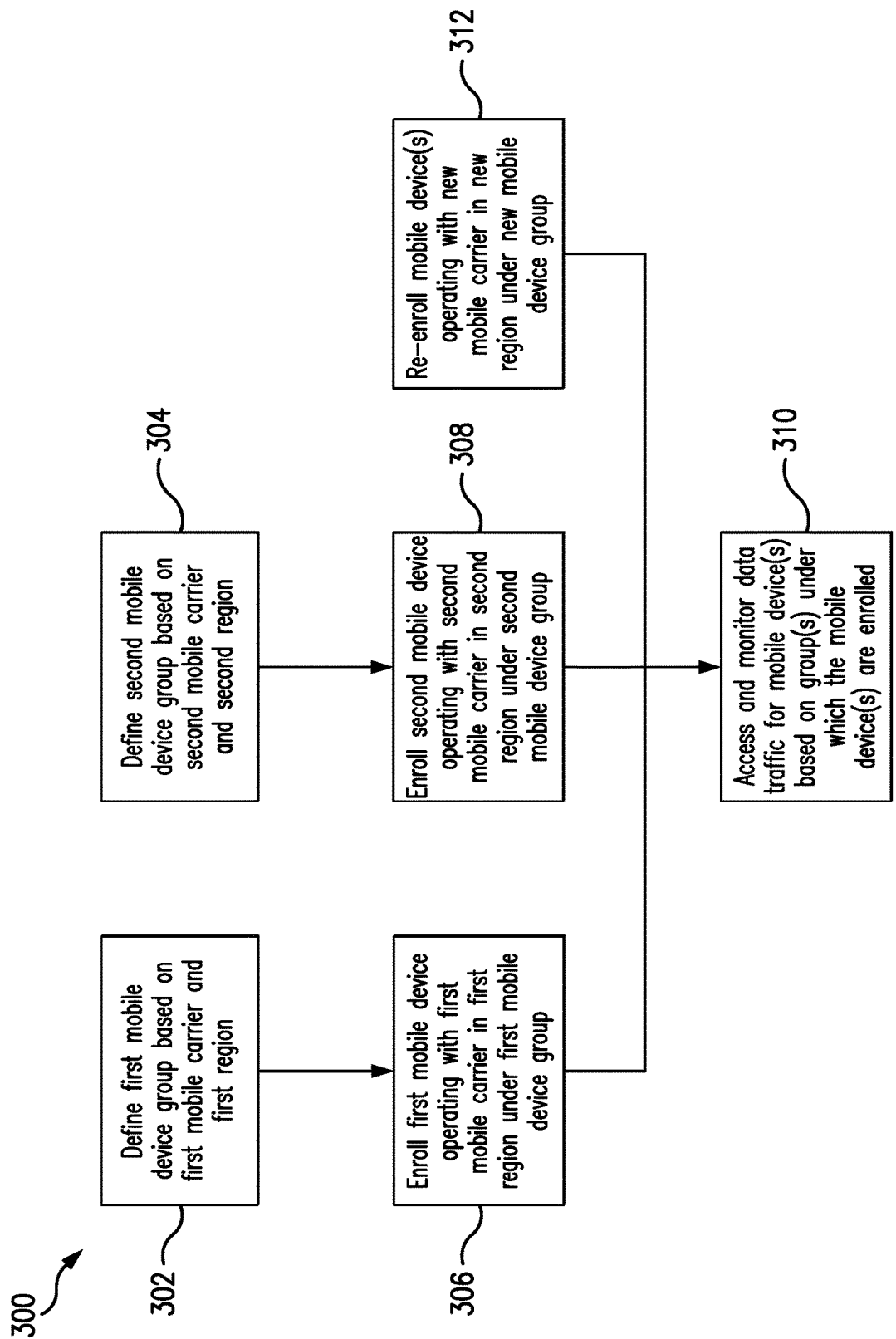
FIG. 3 illustrates an exemplary method for continuously monitoring, without significant reconfiguration, mobile communication device traffic for threats.

FIG. 3 illustrates an exemplary method for continuously monitoring, without significant reconfiguration, mobile communication device traffic for threats. The exemplary method is described (with reference to FIG. 1) as implemented in the server 110 and the mobile communication devices 102*a-c* of the system 100, the MDM system associated with the security applications at the mobile communication devices 102*a-c* and with the security application at the server 110, and with additional reference to the computing device 200. As should be appreciated, however, the methods herein should not be understood to be limited to the exemplary system 100, the exemplary server 110, or the exemplary mobile communication devices 102*a-c*, the exemplary MDM system, the exemplary security applications, or the exemplary computing device 200, and the systems and computing devices herein should not be understood to be limited to the exemplary method 300.

In the exemplary method 300, a first mobile device group is defined (e.g., in a data structure associated with an active directory for the server 110 (e.g., in memory 204 associated therewith, etc.), etc.) based on a first mobile carrier (e.g., mobile carrier 106*a*, etc.) and a first region (e.g., Region A, etc.), at 302. A second mobile device group is defined (e.g., in an active directory for the server 110 (e.g., in memory 204 associated therewith, etc.), etc.) based on a second mobile carrier (e.g., mobile carrier 106*b*, etc.) and a second region (e.g., Region B), at 304. In connection therewith, in this example, the users of mobile communication devices 102*a-b* are operating their devices 102*a-b* with mobile carrier 106*a* in Region A. The user of mobile communication device 102*c* is operating his/her device 102*c* with mobile carrier 106*b* in Region B.

Consistent with the enrollment process described above, mobile communication devices 102*a-b* are enrolled under the first mobile device group, at 306 (e.g., in response to an enrollment command issued to the MDM system associated with the security applications, consistent with the enrollment process described above, whereby the devices 102*a-b* are indicated as members of the first mobile device group in a data structure at the server 110; etc.). And, mobile communication device 102*c* is enrolled under the second mobile device group, at 308 (e.g., in response to an enrollment command issued to the MDM system associated with the security applications, consistent with the enrollment process described above, whereby the device 102*c* is indicated as a member of the second mobile device group in a data structure at the server 110; etc.).

Then (or earlier), data traffic for the mobile communication devices 102*a-c* is accessed and monitored, at 310, by a mobile security application at each device and by a security application at the server 110 (e.g., a Wandera® mobile security application, etc.), consistent with the threat detection process described above. In order for the mobile security application at the devices 102*a-c* and the security application hosted at the server 110 to operate as described above, the security applications access and monitor data traffic associated with the mobile communication devices 102*a-c* in accordance with carrier- and/or region-specific requirements (e.g., by way of carrier- and/or region-specific codes retrieved from the MDM system, etc.). In connection therewith, the security applications access and monitor data traffic for the mobile communication devices 102*a-c* based on the defined groups under which the devices 102*a-c* are enrolled (consistent with the above). In this manner, consistent with the above, the security applications are mapped to the active directory for the server 110. In view of the above, it should be appreciated that the security applications access and monitor data traffic for each of mobile communication devices 102a-c, at 310, when each device is operating in accordance with the one or more characteristics (in this example, the mobile carrier and region of operation) on which the mobile device group under which the device is enrolled is based.

Next in the method 300, while the security applications access and monitor data traffic for the mobile communication devices 102a-c based on the defined groups under which the devices 102a-c are enrolled, one or more of the mobile communication devices 102a-c may change mobile carriers and/or regions of operation. The mobile communication device(s) 102a-c that changes mobile carriers and/or regions of operation may, then, may be re-enrolled under a new mobile device group, at 312 (e.g., in response to a move command issued to the MDM system, consistent with the re-enrollment process described above, whereby the device(s) 102a-c are indicated as a member of the new mobile device group in a data structure at the server 110; etc.), whereby the security applications may easily continue, at 310, to access and monitor, for threats, data traffic for the mobile communication device(s) 102a-c in accordance with the new mobile carrier- and/or region-specific requirements (e.g., by applying mobile carrier- and/or region-specific codes in order to access and monitor data traffic for the device, etc.).

For example, as discussed above in the system 100, the user of mobile communication device 102a may relocate from Region A to Region B and change from mobile carrier 106a to the mobile carrier 106b (consistent with the arrowed line in FIG. 1). In connection therewith, at 312 in the method 300, the mobile communication device 102a is easily re-enrolled under the second mobile device group (defined at 304) by enrolling the mobile communication device 102a in the second mobile device group relating to mobile carrier 106b and Region B (consistent with the enrollment process described above) (e.g., in response to a move command issued to the MDM system, consistent with the re-enrollment process described above, whereby the device 102a is indicated as a member of the second mobile device group in a data structure at the server 110; etc.). The security applications, then, may continue, at 310, to access and monitor, for threats, data traffic for mobile communication device 102a in accordance with mobile carrier 106b- and Region B-specific requirements (e.g., by applying mobile carrier 106b- and Region B-specific codes in order to access data and monitor traffic for device 102a, etc.) for the mobile device group in which the mobile communication device 102a is re-enrolled.

It should be appreciated that in the exemplary method 300, operations 302-312 may be performed sequentially or one or more of the operations 302-312 may be performed, at least in part, concurrently. For example, the security applications may access and/or monitor data traffic for threats, at 310, while a mobile communication device is enrolled under a mobile device group, at 306 or 308, or re-enrolled under a new mobile device group, at 312. As a further example, a new mobile device group may be defined, at 302 or 304, while the security applications access and monitor data traffic for threats, at 310.

In view of the above, the systems and methods herein permit the continuous monitoring of traffic, directed to and originating from a plurality of mobile communication devices, for threats, without, generally, manually reconfiguring the devices or deleting the devices from the MDM system (and then enrolling the mobile communication device again into the MDM system (e.g., wiping the mobile communication device and essentially starting over, etc.)), etc. when one or more of the mobile communication devices changes wireless carriers or regions of operation.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and without limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) defining, in one or more data structures, a plurality of mobile device groups, where each of the mobile device groups is based on a mobile carrier and a region; (b) enrolling, by a server computing device, at least one mobile communication device under one of the plurality of mobile device groups, when the at least one mobile communication device is associated with the mobile carrier and the region on which the one of the plurality of mobile device groups is based; (c) monitoring, by at least one security application, data traffic for the at least one mobile communication device for threats, based on the mobile device group under which the at least one mobile communication device is enrolled; (d) when the at least one mobile communication device is no longer associated with the mobile carrier and/or the region of the one of the plurality of mobile device groups under which the at least one mobile communication device is enrolled and is associated with a new mobile carrier and/or region, re-enrolling, by the server computing device, the at least one mobile communication device under a different one of the plurality of mobile device groups, where the different one of the plurality of mobile device groups based on the new mobile carrier and/or region; whereby the at least one security application may continue monitoring data traffic for threats for the at least one mobile communication device, based on re-enrollment under the different one of the plurality of mobile device groups, without manually reconfiguring the at least one mobile communication device.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in monitoring data traffic for mobile communication devices for threats, the method comprising:
    defining, in one or more data structures, a plurality of mobile device groups, each of the mobile device groups based on a mobile carrier and a region;
    enrolling, by a server computing device, at least one mobile communication device under one of the plurality of mobile device groups, when the at least one mobile communication device is associated with the mobile carrier and the region on which the one of the plurality of mobile device groups is based;
    monitoring, by at least one security application, data traffic for the at least one mobile communication device for threats, based on the mobile device group under which the at least one mobile communication device is enrolled; and
    when the at least one mobile communication device is no longer associated with the mobile carrier and/or the region of the one of the plurality of mobile device groups under which the at least one mobile communication device is enrolled and is associated with a new mobile carrier and/or region, re-enrolling, by the server computing device, the at least one mobile communication device under a different one of the plurality of mobile device groups, the different one of the plurality of mobile device groups based on the new mobile carrier and/or region;
    whereby the at least one security application may continue monitoring data traffic for threats for the at least one mobile communication device, based on re-enrollment under the different one of the plurality of mobile device groups, without manually reconfiguring the at least one mobile communication device.

2. The method of claim 1, wherein monitoring data traffic for the at least one mobile communication device includes monitoring the data traffic based on at least one code associated with the mobile carrier and/or at least one code associated with the region of the one of the plurality of mobile device groups under which the at least one mobile communication device is enrolled.

3. The method of claim 1, wherein each of the plurality of mobile device groups is associated with a different mobile carrier.

4. The method of claim 1, wherein each of the plurality of mobile device groups is associated with a different region.

5. The method of claim 1, wherein enrolling the at least one mobile communication device under the one of the plurality of mobile devices groups includes indicating in a data structure that the at least one mobile communication device is a member of the one of the plurality of mobile device groups; and
    wherein re-enrolling the at least one mobile communication device under the different one of the plurality of mobile device groups comprises indicating in the data structure that the at least one mobile communication device is a member of the different one of the plurality of mobile device groups.

6. The method of claim 5, wherein enrolling the at least one mobile communication device under the one of the plurality of mobile device groups further includes enrolling the at least one mobile communication device in response to an enrollment command; and
    wherein re-enrolling the at least one mobile communication device under the different one of the plurality of mobile device groups further includes re-enrolling the at least one mobile communication device in response to a move command.

7. The method of claim 6, wherein the enrollment command is received via a mobile device management (MDM) system associated with the at least one security application; and
    wherein a move command is received via the MDM system.

8. The method of claim 7, wherein the data structure is associated with an active directory service; and
    wherein the at least one security application is mapped to the active directory service.

9. The method of claim 1, further comprising detecting at least one threat in the monitored data traffic; and providing an indication of the at least one detected threat to the mobile communication device.

10. The method of claim 1, wherein the at least one security application is remote from the at least one mobile communication device.

11. A non-transitory computer-readable storage media including executable instructions for monitoring data traffic for mobile communication devices for threats, which, when executed by at least one processor, cause the at least one processor to:

define, in one or more data structures, a plurality of mobile device groups, each of the plurality of mobile device groups based on one or more characteristics;

enroll a first mobile communication device in a first one of the plurality of mobile device groups, by indicating in the one or more data structures that the first mobile communication device is a member of the first one of the plurality of mobile device groups;

enroll a second mobile communication device in a second one of the plurality of mobile device groups, by indicating in the one or more data structures that the second mobile communication device is a member of the second one of the plurality of mobile device groups;

monitor data traffic for the first mobile communication device for threats based on the mobile device group under which the first mobile communication device is enrolled, and monitor data traffic for the second mobile communication device based on the mobile device group under which the second mobile communication device is enrolled; and re-enroll the first and/or second mobile communication device in a different one of the plurality of mobile device groups.

12. The non-transitory computer-readable storage media of claim 11, wherein the one or more characteristics on which each of the plurality of mobile device groups is based includes a mobile carrier and a region.

13. The non-transitory computer-readable storage media of claim 12, wherein the executable instructions, when executed by the at least one processor in connection with monitoring data traffic for the first mobile communication device and the second mobile communication device, cause the at least one processor to:

monitor data traffic for the first mobile communication device for threats based on a code associated with the mobile carrier and/or a code associated with the region of the mobile device group under which the first mobile communication device is enrolled; and monitor data traffic for the second mobile communication device for threats based on a code associated with the mobile carrier and/or a code associated with the region of the mobile device group under which the second mobile communication device is enrolled.

14. The non-transitory computer-readable storage media of claim 13, wherein the mobile carrier of the first one of the plurality of mobile device groups is different from the mobile carrier of the second one of the plurality of mobile device groups; and/or wherein the region of the first one of the plurality of mobile device groups is different from the region of the second one of the plurality of mobile device groups.

15. The non-transitory computer-readable storage media of claim 11, wherein the executable instructions, when executed by the at least one processor, cause the at least one processor to:

detect at least one threat in the monitored data traffic for the first mobile communication device; and in response to the threat, indicate at least one of: an identity of the first mobile communication device, a time of detection of the at least one threat, a type of the at least one threat, and an identity of the at least one threat.

16. The non-transitory computer-readable storage media of claim 11, wherein the executable instructions, when executed by the at least one processor in connection with enrolling the first mobile communication device, cause the at least one processor to enroll the first mobile communication device in response to an instruction from a mobile device management (MDM) system;

wherein the executable instructions, when executed by the at least one processor in connection with enrolling the second mobile communication device, cause the at least one processor to enroll the second mobile communication device in response to an enrollment instruction from the MDM system; and wherein the executable instructions, when executed by the at least one processor in connection with re-enrolling the first and/or second mobile communication device, cause the at least one processor to re-enroll the first and/or second mobile communication device in response to an instruction from the MDM system.

17. The non-transitory computer-readable storage media of claim 11, wherein the one or more data structures are associated with an active directory service.

18. A system for use in monitoring data traffic for mobile communication devices for threats, the system comprising:

at least one computing device comprising at least one processor coupled to one or more data structures, the one or more data structures defining a plurality of mobile device groups, each of the mobile device groups based on a mobile carrier and a region, the at least one processor configured to:

enroll a first mobile communication device in a first one of the plurality of mobile device groups, by indicating in the one or more data structures that the first mobile communication device is a member of the first one of the plurality of mobile device groups;

enroll a second mobile communication device in a second one of the plurality of mobile device groups, by indicating in the one or more data structures that the second mobile communication device is a member of the second one of the plurality of mobile device groups;

monitor data traffic for the first mobile communication device for threats based on the mobile device group under which the first mobile communication device is enrolled, and monitor data traffic for the second mobile communication device for threats based on the mobile device group under which the second mobile communication device is enrolled; and re-enroll the first and/or second mobile communication device in a different one of the plurality of mobile device groups.

19. The system of claim 18, wherein the at least one processor is configured to:

monitor the data traffic for the first mobile communication device for threats based on a code associated with the mobile carrier and/or a code associated with the region of the mobile device group under which the first mobile communication device is enrolled; and monitor the data traffic for the second mobile communication device for threats based on a code associated with the mobile carrier and/or a code associated with the region of the mobile device group under which the second mobile communication device is enrolled.

20. The system of claim 19, wherein the at least one processor is configured, when the first and/or second mobile communication device is re-enrolled under the different one of the plurality of mobile device groups, to monitor data traffic for the re-enrolled mobile communication device for threats based on a code associated with the mobile carrier and/or a code associated with the region of the different one of the plurality of mobile device groups under which the first and/or second mobile communication device is re-enrolled.

* * * * *